United States Patent [19]

Darlington et al.

[11] Patent Number: 4,591,971

[45] Date of Patent: May 27, 1986

[54] METHOD AND APPARATUS FOR PARALLEL PROCESSING OF DIGITAL SIGNALS USING MULTIPLE INDEPENDENT SIGNAL PROCESSORS

[75] Inventors: John Darlington; Michael J. Reeve, both of London, England

[73] Assignee: National Research Development Corporation, London, England

[21] Appl. No.: 688,373

[22] Filed: Jan. 2, 1985

Related U.S. Application Data

[63] Continuation of Ser. No. 433,094, Oct. 6, 1982, abandoned.

[30] Foreign Application Priority Data

Oct. 15, 1981 [GB] United Kingdom ............... 8131085

[51] Int. Cl.⁴ ............................................ G06F 15/16
[52] U.S. Cl. ................................................... 364/200
[58] Field of Search ..................... 364/200 MS File; 370/60, 94

[56] References Cited

U.S. PATENT DOCUMENTS 3,648,252  3/1972  Thron et al. .................. 364/200
4,130,885 12/1978  Dennis .......................... 364/900

OTHER PUBLICATIONS

"A Multi-Processor Reduction Machine for User-Defined Reduction Languages", by Philip C. Treleaven and Geoffrey F. Mole, Computing Laboratory, The University of Newcastle upon Tye, England, May 1980, Conference Proceedings, The 7th Annual Symposium on Computer Architecture.
"Computer Cells—A Network Architecture for Data Flow Computing", by David L. Nelson, Robert L. Gordon, Prime Computer, Inc., Framingham, Mass., 1978.
"A Computer Simulation Facility for Packet Communication Architecture", by Clement K. C. Leung, David P. Misuanas, Andrij Neczwid and Jack B. Dennis, *Institute of Electrical and Electronics Engineers*, Proceedings of the 3rd Annual Symposium on Computer Architecture; Jan. 1976, vol. 3.
"A Peripheral Array Computer and its Applications", by H. Schomberg, Philips GmbH Forschungslaboratorium Hamburg, 2000 Hamburg 54, FRG 1977.

*Primary Examiner*—Raulfe B. Zache
*Attorney, Agent, or Firm*—Cushman, Darby & Cushman

[57] ABSTRACT

A digital computer has an addressable store 1, which may comprise segments 1a, 1b, etc. and a plurality of independent digital processing units 3a, 3b, etc. all communicating with the store 1 through a communication facility 2.

Addresses in store 1 containing packets of digital data which require processing are held in a group of identifier stores 4a, 4b, etc. to which group the processing units all have access. Where processing results in the generation of fresh packets of data addresses for such data in store 1 are held in a second group of identifier stores 5a, 5b to which the processing units also have access. Controllers 6a, 6b, etc. and 7a, 7b, etc. ensure even transfer of identifier address among the stores of a group and act as interfaces between the identifier stores and the processing units.

52 Claims, 2 Drawing Figures

METHOD AND APPARATUS FOR PARALLEL PROCESSING OF DIGITAL SIGNALS USING MULTIPLE INDEPENDENT SIGNAL PROCESSORS

This is a continuation of application Ser. No. 433,094 filed Oct. 6, 1982, now abandoned.

This invention relates to digital computers.

The conventional digital computer is constructed in accordance with what is generally termed the von Neumann model and basically comprises a binary digital store and a single central processor with peripheral input and output units. The computer functions by executing a program which comprises a list of instructions in binary form which is held in part of the store. The instructions are fetched by the central processor one at a time from the store and each is obeyed in turn. The computer can thus only carry out a program one instruction at a time and however fast the speed with which it can obey the individual instructions, the requirement for a single step-by-step sequence constitutes a limiting constraint. Often the computation being performed is such that many parts of the computation are independent of each other and could be computed in parallel, however computers constructed according to the von Neumann model are unable to exploit this. If an alternative architecture to the von Neumann model could be designed to overcome this constraint it would offer many advantages. Various architectures using many processing units have been suggested recently but most of these conform to the von Neumann model and all have their limitations.

It is an object of this invention to provide a digital computer capable of effective multi-processor operation.

A computer according to the invention operates on digital information in the form of "packets". A packet is a collection of binary digits divided into fields. The fields are described more fully below and usually include instruction digits. A packet is identified by an "identifier" which is a unique digital value and may conveniently comprise the address where that packet is located. The identifier constitutes one field of the packet.

According to the invention a digital computer comprises:
digital store means for storing packets;
a plurality of independent digital processing units;
communication means for the transfer of packets between the processing units and the digital store means;
two groups of digital stores each arranged to store identifiers of packets, each group having transfer means for enabling any identifier stored in any store of a group to be transferred to any other store within that group, one group of identifier stores being arranged to carry identifies of packets which require processing and the other groups of identifier stores being arranged to carry identifiers of locations in the packet store which are available to receive packets; and
interface means between the processing units and both groups of identifier stores to enable transfer of identifiers in either direction between the processing units and the groups of identifier stores.

In preferred embodiments the number of identifier stores in each group corresponds to the number of processing units and the interface means couple each processing unit to an individual identifier store of each group. Preferably the identifier stores of the respective groups are coupled together in ring-like fashion through their transfer means.

The packet store may comprise a plurality of storage segments and it may be convenient but it is in no way essential that the number of storage segments corresponds to the number of processing units.

In operation the group of identifer stores which carry identifiers of packets which require processing present these identifiers through the interface means to the processing units when they are called for and the communication means, which may comprise a network or bus, allows the transfer of identifies from the processing units to address the packet store and to return identified packets to the processing units. Each processing unit functions in a manner analogous to the central processor of a conventional computer and contains its own instruction set which enables it to proceed with that part of the computation that is specified by the instructions in the packet. In the course of the computation new packets may be generated and these will require identifiers to enable them to be stored in the packet store.

Identifiers of those locations in the packet store that are available are carried in the second group of identifier stores and when required an identifier is called down from this second group through the interface means and the new packet is transferred through the communication means to the address in the packet store defined by the called down identifier.

It is a feature of the invention that identifiers are readily transferable through the transfer means from store to store within a group. The transfer means operate to even out the number of identifiers held in different stores as far as possible. Thus, as computation proceeds there will be a steady "sideways" transfer of identifiers throughout a group as well as "vertical" transfer of identifiers between the identifier stores and the processing units through the interface means. In embodiments of the invention, a controller associated with each store can provide the function of both the transfer means between neighbouring identifier stores and the interface means between an identifier store and associated processing unit.

In order that the invention may be more fully understood, reference will now be made to the accompanying drawing in which.

Figures 1, 2:
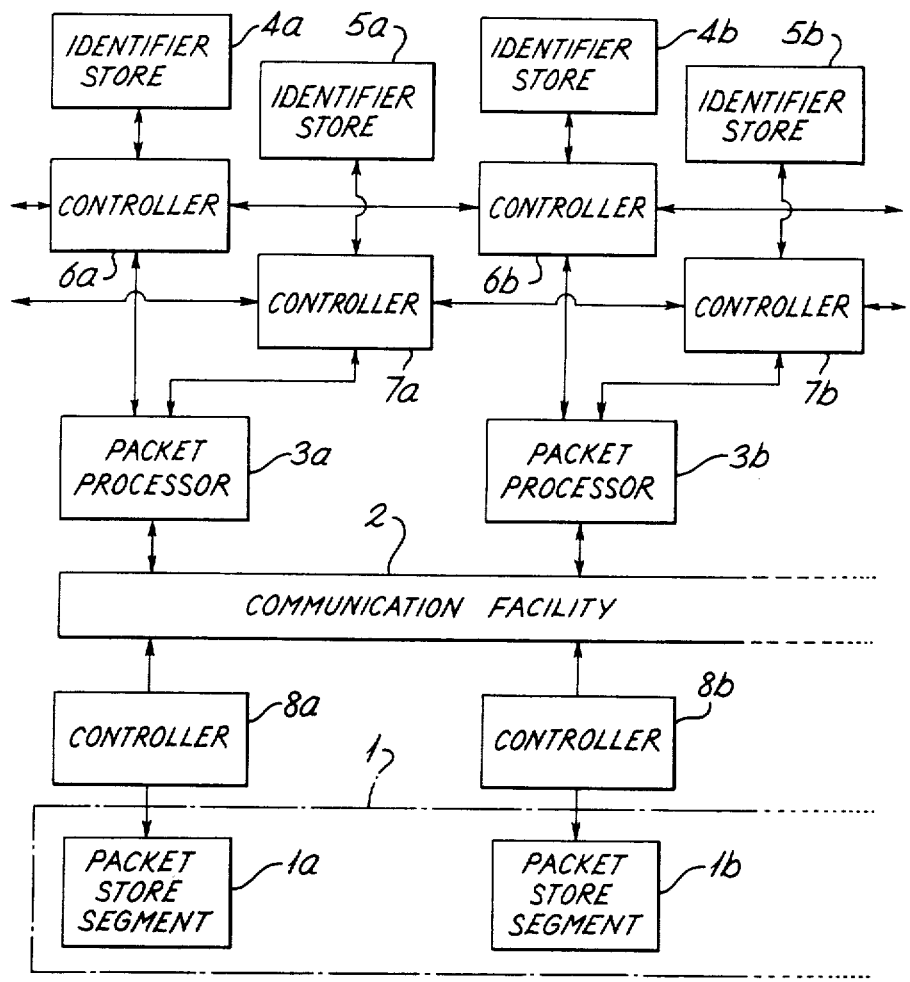
FIG. 1 illustrates in diagrammatic form a computer embodying the invention.
FIG. 2 shows diagrammatically a packet divided into fields.

The computer illustrated in FIG. 1 comprises a main store 1 for storing packets and which is divided into store segments 1a, 1b, etc. Any number of such store segments can be provided. All the segments of store 1 are connected through segment controllers 8a 8b etc. associated with each store segment to a communication facility 2 which may comprise a bus or network. The segments of store 1 are so organised that every location has a unique address. Store 1 as a whole thus acts as a unitary store. An address selection mechanism is provided for store 1. Segment selection occurs in communication facility 2 and the relevant segment controller 8a or 8b, etc. functions to select the required location within a segment. Thus the presentation of any valid identifying address causes the selection of the appropriate location in one of the segments, for writing to or reading from as required. Segment controllers 8a, 8b, etc. may also have an active role in modifying packets stored in the store segments to which they are connected.

Store 1 may be formed of segments as shown or else can be a single store. It may be constructed from magnetic or semiconductor memory or any other suitable digital storage medium.

The computer has a plurality of separate processing units 3a, 3b, etc. which are independent of each other and which can carry out a prescribed set of computation operations according to instruction sets stored internally. All processing units are connected to the communication facility to enable packets to be read from store 1 to any processing unit and to be written into any location in store 1 from any processing unit.

Identifiers, which are the addresses in store 1 of packets, are stored in either of two groups of identifier stores. One group 4a, 4b, etc. stores identifiers of packets which require processing while the other group 5a, 5b, etc. stores identifiers of locations in store 1 which are available to receive packets. Identifier stores 4a, 4b, etc. are coupled to associated controllers 6a, 6b, etc. Similarly identifier stores 5a, 5b, etc. are coupled to associated controllers 7a, 7b, etc. The identifer stores are preferably linear stores in which the identifiers are held in a single sequence. Stack or "push-down" stores are examples of such stores.

The controllers 6a, 6b, etc. and the controllers 7a, 7b, etc. have two functions. One function is to act as transfer means whereby identifiers held in the identifier store coupled to that controller can be transferred to other identifier stores in a group. The other function is to act as an interface to the associated processing unit for the provision of identifiers from the identifier store to the processing unit when called for and the storage of identifiers in the identifier store when provided by a processing unit.

As to the transfer function from store to store in a group, the controllers operate to even out the number of identifiers in each store of a group as far as feasible. Since the identifiers are in a linear sequence the identifiers for transfer can be selected for transfer on a "first in first out" basis or on a "last in first out" basis. To facilitate transfer all the controllers of a group can be coupled together in ring-like fashion with all transfers neighbour to neighbour, but this is not essential and other forms of connection can be provided as long as it is possible to transfer any identifier to any store in a group eventually.

The layout of a packet is shown in FIG. 2. A packet comprises three primary fields 11, 12 and 13. Field 11 is the identifier of the packet, that is its unique identification and this is normally the address in the packet store at which the packet is located. Field 12 is known as the function field and holds binary data specifying the operations to be carried out when this packet is processed. Field 13, known as the argument list field, contains the identifiers of packets containing data required during the processing of this packet (i.e. the arguments of the function). When a packet is employed to represent a numeric value, field 13 holds the number in binary form. In addition, there are three secondary fields 14, 15 and 16 which hold information pertinent to controlling the operation of the computer. The function of these secondary fields will be described below.

If packet store 1 is implemented using conventional addressable memory, the packet when stored in the packet store need not include the identifier field 11 as this information is implicitly in the binary digital value of the address of the location of the packet within the store.

The mode of operation of the computer illustrated in FIG. 1 is that the identifiers of packets in store 1 which are available to be processed are supplied to identifier store group 4a, 4b, etc. Whenever a processing unit requires further work it removes an identifier from its associated identifier store and supplies this address through communication facility 2 to obtain the contents of the packet contained in the location in store 1 named by that identifier. Processing then takes place in the processing unit in accordance with the operation defined by the function field 12 of the packet and the instructions stored within the processing unit. Such processing may generate further packets which will be required to be stored and where a location is needed to store a newly generated packet the processing unit removes an identifier from its associated identifier store 5a or 5b etc. and sends the new packet with its identifier through communication facility 2 to store 1. The identifier of the packet is then used to address the location in store 1 where the packet is to be written. If a new packet requires processing, the processor generating that packet places the identifier of that packet in its associated identifier store 4a or 4b etc.

Clearly not all packets are processable at any one instant. For example the function field 13 may specify an arithmetic operation the operators of which (the packets whose identifiers are listed in the argument list field) are not all in the required form. Use may therefore be made in a packet of the status field 14 and the signal list field 16 to implement an arrangement whereby a packet can be marked as not currently processable and signals sent to it when the processing of other packets make it processable. When a packet is not processable due to the fact that it requires other packets to be further processed, its indentifier is placed in the signal list field 16 of the packets that it is waiting on. In addition a part of its own status field 14 is set to indicate that the packet is waiting. Such a packet is termed "asleep". The identifiers of asleep packets are not held in identifier stores 4.

When a packet is processed "wake-up" signals are sent to any packets whose identifiers appear in its signal list field 16. When an asleep packet has received the required number of "wake-up" signals then its status field 14 is set to indicate that it is now "awake" and available for processing. Its identifier is then put into one of the identifier stores 4a, 4b, etc. by the processor responsible for sending the final "wake-up" signal or by one of the packet store controllers 8a, 8b, etc.

Sometimes a packet may no longer be required although it is still held in store 1. Such a packet is colloquially termed "garbage". Field 15, the reference count field of a packet, indicates how many other packets refer to that packet as data, that is to say how many times its identifier appears in the argument list of other packets. The reference counts are adjusted as the processing of packets modifies their references to other packets. Such adjustment may be carried out by the segment controller 8a or 8b, etc. associated with the segment in store 1 where a packet which requires its reference count field to be adjusted is held.

When the reference count of any packet becomes zero, that packet has become garbage and its store location may be re-used. This is achieved by an operation termed "garbage collection" whereby a processor is used to place the identifiers of such packets in an identifier store 5a, 5b, etc. indicating that these locations are now available for new packets. This process of garbage collection can take place in parallel with other operations.

While in general it may be desirable that all processing units carry out all functions that can be carried out in the machine, it is possible to provide that processing units are limited or dedicated to specific or a limited number of functions. In particular, one or more processing units can include input and output arrangements.

There is no inherent limit to the size of a computer constructed as described with reference to FIG. 1. To increase the size of the computer all that is required is to increase the number of processing units and likewise the number of identifier stores in the two respective groups. Similarly, additional segments may be required in store 1. If desired, however, it is possible to arrange a computer embodying the invention in hierarchical form. Such an arrangement comprises a plurality of blocks each block corresponding to a computer illustrated in FIG. 1. The blocks need to be interconnected in two ways. Firstly, all the packet stores (stores 1) need to act as a single addressable store. An interconnecting network, which may be a crossbar-type switching mechanism or the equivalent, is required to which all the packet stores are connected. Additionally, corresponding groups of identifier stores in the individual blocks need to be interconnected to enable transfer of indentifiers from one corresponding group to another in different blocks.

A computer as described above is particularly suited to a wide variety of programming languages that express programs as a set of rules for rewriting expressions, although it is equally possible to execute programs written in more conventional languages of the kind conforming to the von Neumann architecture of computers.

In the above description the identifiers constitute the addresses of the packets in the packet store. However this is not essential and it is possible for the identifiers to be digital values other than addresses which uniquely identify packets, in which case an appropriate mechanism is required for locating an identified packet in the packet store.

We claim:

1. A digital computer comprising:
   digital store means for storing digital data at identifiable locations in the form of packets comprising both instructions and other data for processing in accordance with such instructions;
   a plurality of independent digital processing units for processing said packets;
   communication means for transferring data between the processing units and the digital store means;
   a first group of discrete digital stores arranged to store identifiers of packets which require processing; and
   transfer and interface means connected to said first group of stores for enabling any identifier stored in any store of said first group to be transferred to any other store within that group and to enable transfer of identifiers in either direction between the processing units and the first group of identifier stores.

2. The digital computer as claimed in claim 1 in which the number of identifier stores in the group corresponds to the number of processing units and the transfer and interface means couples each processing unit to an individual identifier store of that group.

3. The digital computer as claimed in claim 1 in which the digital store means comprises a plurality of storage segments.

4. The digital computer as claimed in claim 3 in which the number of storage segments corresponds to the number of processing units.

5. A digital computer as in claim 3 wherein said communication means enables transfer of packets to take place between any one of said processing units and any of said storage segments.

6. The digital computer as in claim 1 further including:
   means for storing identifiers of locations in the digital store means which are available to receive packets; and
   means for transferring said location identifiers from said locations identifiers storing means to the processing units when packets processed by said processing units are required to be stored in the digital store means.

7. The digital computer as in claim 1 further including:
   a second group of discrete stores arranged to store identifiers of ones of the locations in the digital store means which are available to receive packets; and
   a further transfer and interface means associated with said second group of stores for enabling any identifier stored in any of said stores of said second group to be transferred to any other store within said second group and for coupling the processing units to at least one of the stores in the second group.

8. A digital computer as in claim 7 wherein:
   the number of identifier stores in said second group corresponds to the number of processing units; and
   the further transfer and interface means couples each processing unit to a respective identifier store in said second group.

9. A digital computer comprising:
   digital store means for storing digital data at identifiable locations in the form of packets comprising both instructions and other data for processing in accordance with such instructions;
   a plurality of independent digital processing units for processing said packets;
   communication means for transferring data between the processing units and the digital store means;
   a first group of discrete digital stores arranged to store identifiers of packets which require processing;
   a second group of discrete stores arranged to store identifiers of ones of the locations in said digital store means which are available to receive packets; and
   separate transfer and interface means connected to each of said first and second groups of stores for enabling any identifier stored in any store of a group to be transferred to any other store within that group and to enable transfer of identifiers in either direction between the processing units and the groups of identifier stores.

10. The digital computer as claimed in claim 9 in which the identifier stores of the respective groups are coupled together in ring-like fashion through said transfer and interface means.

11. A digital computer as in claim 9 wherein:

the number of identifier stores in each group correspond to the number of processing units; and said transfer and interface means associated with each group of stores couples each processing unit to a respective identifier store of each group.

12. A digital computer as in claim 9 wherein said digital store means comprises a plurality of storage segments.

13. A digital computer as in claim 12 wherein the number of storage segments corresponds to the number of processing units.

14. A system for processing digital signals comprising:

plural independent digital signal processing means each for independently processing digital signals communicated thereto;

first digital signal storing means for storing a first plurality of respective packets of digital signals;

means for scheduling said first plurality of packets for processing by selected ones of said processing means and for rescheduling at least one of said first plurality of packets for processing by any selected one of said processing means other than the processing means previously scheduled to process said one packet; and means for communicating selected packets between said first storing means and the ones of said processing means scheduled to process said selected packets.

15. A system as in claim 14 wherein said scheduling means includes:

a first plurality of discrete identifier storing means for storing data identifying said first plurality of packets, each of said first plurality of identifier storing means associated with at least one of said processing means; and means for transferring data from at least a first of said first plurality of identifier storing means to any other one of said first plurality of storing means.

16. A system as in claim 5 wherein said data transferring means also selects said other one of said first plurality of storing means.

17. A system as in claim 15 wherein:

each of said first plurality of packets includes a function data field representing an operation to be performed and an argument list data field representing at least one argument; and each of said processing means includes means for processing the argument represented by the argument list data field of each packet communicated thereto in accordance with the operation represented by the function data field of said packet to produce a result.

18. A system as in claim 17 wherein:

said first storing means also stores a second plurality of packets each of which include a function data field representing an operation to be performed and an argument list data field identifying at least a first of said first plurality of packets;

said scheduling means includes means for determining when one of said processing means has produced a result in accordance with said operation represented by the function data field and said argument represented by said argument list data field of said first packet; and said scheduling means also schedules the ones of said second plurality of packets including an argument list data field identifying said first packet for processing by a processing unit in response to the determination of said determining means.

19. A system as in claim 18 further including means for linking ones of said second plurality of packets to ones of said first plurality of packets.

20. A system as in claim 18 wherein:

said first packet further includes a signal list data field identifying each of said second plurality of packets which include an argument list data field identifying said first packet;

each of said processing means further includes means for transmitting a signal to each of said second plurality of packets identified by the signal list data field of the ones of said first plurality of packets communicated thereto; and said determining means comprises means for determining which of said second plurality of packets have received a signal transmitted by said transmitting means.

21. A system as in claim 20 wherein:

said system further includes means for identifying portions of said first storing means available for storing new packets;

each of said processing means also selectively generates new ones of said first plurality of packets;

said communicating means also communicates said newly generated packets to said first storing means for storage in a portion of said first storing means identified by said available portions identifying means; and said scheduling means also schedules said newly generated packets for processing by selected ones of said processing means.

22. A system as in claim 21 wherein said available portions identifying means includes:

a second plurality of discrete identifier storing means each storing data identifying portions of said first storing means available for storing new packets, each of said second plurality of discrete storing means associated with at least one of said processing means; and means for transferring data from a first of said second plurality of storing means to any other one of said second plurality of storing means.

23. A system as in claim 22 wherein:

said data identifying portions of said first storing means available for storing new packets includes a plurality of respective indicia of spaces in said first storing means each capable of storing exactly one packet; and each of the indicia of said spaces is stored in only one of said second plurality of identifier storing means.

24. A system as in claim 22 further including means for communicating data identifying the location in said first storing means of ones of said first plurality of packets not identified by the argument list data field of any of said second plurality of packets between said processing means and said second plurality of storing means.

25. A system as in claim 22 wherein each of said second plurality of discrete identifier storing means comprises a stack.

26. A system as in claim 15 wherein:

said first storing means also stores a second plurality of packets the processing of each of which requires a result produced by the processing of at least one of said first plurality of packets;

at least a first of said first plurality of packets further includes a signal list data field identifying the ones of said second plurality of packets the processing of which require a result produced by the processing of said first packet;

each of said processing means further includes means for transmitting a signal to each of said second plurality of said packets identified by the signal list data field of the ones of said first plurality of packets communicated thereto; and said system further includes determining means for determining which of said second plurality of packets have received a signal transmitted by said transmitting means.

27. A system as in claim 26 wherein:

said system further includes means for identifying portions of said first storing means available for storing new packets;

each of said processing means also selectively generates new ones of said first plurality of packets;

said communicating means also communicates said newly generated packets to said first storing means for storage in a portion of said first storing means identified by said available portions identifying means; and said scheduling means also schedules said newly generated packets for processing by selected ones of said plurality of processing means.

28. A system as in claim 15 wherein:

each of said processing means also selectively generates new ones of said first plurality of packets; and said system further includes:

a second plurality of discrete identifier storing means each storing data identifying portions of said first storing means available for storing new packets, each of said second plurality of storing means associated with at least one of said processing means, and means for transferring data from a first of said second plurality of storing means to any other one of said second plurality of storing means.

29. A system as in claim 15 wherein each of said first plurality of discrete identifier storing means comprises a stack.

30. A system as in claim 14 wherein:

at least one of said plural processing means is dedicated to performing a predetermined function; and said scheduling means schedules selected ones of said packets for processing by said dedicated processing means.

31. A system as in claim 14 wherein said communicating means comprises a communications network shared by said plural processor means and said first storing means.

32. A method of processing digital signals comprising the steps of:

(1) storing digital signals at identifiable locations of a digital store means in the form of packets comprising both instructions and other data for processing in accordance with such instructions;

(2) communicating digital signals between the digital store means and a plurality of independent digital signal processing units;

(3) processing said packets independently and in parallel at said plurality of processing units;

(4) storing identifiers of locations of packets which require processing at groups of locations separate from the locations of packets the identifiers identify;

(5) transferring identifiers between said groups of locations; and (6) communicating identifiers between said processing units and said groups of locations.

33. A method as in claim 32 further including the step of enabling an identifier stored in any location within one of said groups of locations to be transferred to any other group.

34. A method as in claim 33 wherein:

each of said processing units has associated therewith at least one of said groups of locations; and said communicating step (6) comprises the step of communicating identifiers in either direction between said processing units and the groups of said locations associated with said processing units.

35. A method as in claim 33 wherein said storing step (1) includes the step of storing data in a plurality of storage segments of said digital store means, each of said processing units being associated with a predetermined one of said storage segments.

36. A method as in claim 34 wherein said transferring step (5) includes the step of equalizing the number of identifiers stored in each of the groups of locations.

37. A method as in claim 32 further including:

storing identifiers of locations in said digital store means which are available to receive packets in further groups of locations separate from the locations of packets the identifiers identify;

transferring identifiers between said further groups of locations; and communicating identifiers between said processing units and said further groups of locations.

38. A method of processing digital signals comprising the steps of:

(1) storing a first plurality of respective packets of digital signals in a first store accessible to each of a plurality independent digital signal processing units;

(2) scheduling said first packets for processing by selected ones of said plurality of processing units;

(3) rescheduling at least one of said first plurality of packets for processing by any selected one of said plurality of processing units other than the unit previously scheduled to process said one packet;

(4) communicating selected packets between said first store and the ones of said processing units scheduled to process said selected packets; and (5) processing, independently at each of said processing units, the packets communicated thereto.

39. A method as in claim 38 wherein:

said scheduling step (2) comprises the step of storing data identifying said first plurality of packets in a first plurality of discrete identifier stores, each of said first plurality of identifier stores associated with at least one of said processing units; and said rescheduling step (3) includes the step of transferring data from at least a first of said first plurality of identifier stores to any other one of said first plurality of identifier stores.

40. A method as in claim 39 wherein said data transferring step includes the step of selecting said other one of said first plurality of identifier stores.

41. A method as in claim 39 wherein:

each of said first plurality of packets includes a function data field representing an operation to be performed and an argument data field representing at least one argument; and said processing step (5) includes the step of processing the argument represented by the argument list data field of each communicated packet in accordance with the operation represented by the function data field of said each communicated packet to produce a result.

42. A method as in claim 41 wherein:
said method further includes the step of storing a second plurality of packets in said first store, each of said second plurality of packets including a function data field representing an operation to be performed and an argument list data field identifying at least a first of said first plurality of packets; and
said scheduling step (2) includes the steps of:
  determining when one of said processing units has produced a result in accordance with said operation represented by said function data field and said argument represented by said argument list data field of said first packet, and
  subsequently to said determining step, scheduling the ones of said second plurality of packets including an argument list data field identifying said first packet for processing by a processing unit.

43. A method as in claim 42 further including the step of linking ones of said second plurality of packets to ones of said first plurality of packets.

44. A method as in claim 42 wherein:
said first packet further includes a signal list data field identifying each of said second plurality of packets which include an argument list data field identifying said first packet;
said processing step (5) further includes the step of transmitting a signal from each of said processing units to each of said second plurality of packets identified by the signal list data field of the ones of said processed first plurality of packets; and
said determining step comprises the step of determining which of said second plurality of packets have received a signal transmitted by said transmitting step.

45. A method as in claim 44 wherein said processing step (5) further includes the steps of:
  (a) selectively generating a new one of said first plurality of packets at at least a first of said plurality of processing units;
  (b) identifying a portion of said first store available for storing a new packet;
  (c) storing said new packet generated by said generating step (a) in the portion of said first store identified by said identifying step (b); and
  (d) performing said scheduling step (2) for said new packet.

46. A method as in claim 45 wherein:
said identifying step (b) includes the step of transferring data indentifying a portion of said first store available for storing a new packet to said first processing unit from a predetermined one of a second plurality of discrete stores each containing data identifying portions of said first store available for storing new packets; and
said method further includes the step (x) of transferring data from a first of said second plurality of identifier stores to any other one of said second plurality of stores.

47. A method as in claim 46 wherein said transferring step (x) includes the step of selecting said other one of said second plurality of stores.

48. A method as in claim 46 wherein:
the data identifying said portions of said first store available for storing a new packet includes a plurality of respective indicia of spaces in said first store each capable of storing exactly one packet; and
each of the indicia specifying a space is stored in only one of said second plurality of identifier stores.

49. A method as in claim 46 wherein said processing step (5) further includes the step of storing the data identifying the location in said first store of ones of said first plurality of packets already processed and not identified by the argument list data field of any of said second plurality of packets into one of said second plurality of stores.

50. A method as in claim 38 wherein said processing step (5) includes the steps of:
  (a) selectively generating a new one of said first plurality of packets at at least a first of said processing units;
  (b) identifying a portion of said first store available for storing a new packet;
  (c) storing said new packet generated by said generating step (a) in the portion of said first store identified by said identifying step (b); and
  (d) performing said scheduling step (2) for said new packet.

51. A method as in claim 50 wherein:
said available portion identifying step (b) includes the step of transferring data indentifying a portion of said first store available for storing new packets to said first processing unit from a predetermined one of a second plurality of discrete stores, each of said second plurality of stores containing data identifying portions of said first store available for storing new packets; and
said method further includes the step of transferring data from a first of said second plurality of stores to any other selected one of said second plurality of stores.

52. A method as in claim 38 wherein:
at least one of said processing units is dedicated to performing a predetermined function; and
said scheduling step (2) includes the step of scheduling selected ones of said packets for processing by said dedicated processing unit.

* * * * *